US010860381B1

(12) United States Patent
Cruanes et al.

(10) Patent No.: US 10,860,381 B1
(45) Date of Patent: Dec. 8, 2020

(54) FLEXIBLE COMPUTING

(71) Applicant: Snowflake Inc., San Mateo, CA (US)

(72) Inventors: Thierry Cruanes, San Mateo, CA (US); Igor Demura, San Mateo, CA (US); Varun Ganesh, San Mateo, CA (US); Prasanna Rajaperumal, San Mateo, CA (US); Libo Wang, Foster City, CA (US); Jiaqi Yan, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

(21) Appl. No.: 16/874,388

(22) Filed: May 14, 2020

(51) Int. Cl.
*G06F 9/46* (2006.01)
*G06F 9/50* (2006.01)
*G06F 9/54* (2006.01)
*H04L 29/08* (2006.01)

(52) U.S. Cl.
CPC .......... *G06F 9/5027* (2013.01); *G06F 9/5077* (2013.01); *G06F 9/5083* (2013.01); *G06F 9/542* (2013.01); *H04L 67/1002* (2013.01); *G06F 2209/5011* (2013.01)

(58) Field of Classification Search
CPC ....................................................... G06F 9/52
USPC ........................................................ 718/104
See application file for complete search history.

(56) References Cited

U.S. PATENT DOCUMENTS

| | | | | |
|---|---|---|---|---|
| 7,810,098 | B2* | 10/2010 | Barillari | G06F 9/50 709/226 |
| 2005/0081210 | A1* | 4/2005 | Day | G06F 9/5016 718/104 |
| 2009/0254916 | A1* | 10/2009 | Bose | G06F 16/2455 718/104 |
| 2010/0035643 | A1* | 2/2010 | Omar | H04W 28/18 455/509 |
| 2010/0115095 | A1* | 5/2010 | Zhu | H04L 67/12 709/226 |
| 2013/0091283 | A1* | 4/2013 | Omar | H04L 41/0893 709/226 |
| 2013/0326064 | A1* | 12/2013 | Gulati | G06F 9/4881 709/226 |
| 2014/0068055 | A1* | 3/2014 | Iori | G06F 9/5011 709/224 |
| 2014/0089510 | A1* | 3/2014 | Hao | G06F 9/5072 709/226 |
| 2014/0258446 | A1* | 9/2014 | Bursell | H04L 41/0816 709/217 |
| 2014/0289412 | A1* | 9/2014 | Doddavula | H04L 41/5003 709/226 |

(Continued)

*Primary Examiner* — Mehran Kamran
(74) *Attorney, Agent, or Firm* — Schwegman Lundberg & Woessner, P.A.

(57) ABSTRACT

Embodiments of the present disclosure may provide dynamic and fair assignment techniques for allocating resources on a demand basis. Assignment control may be separated into at least two components: a local component and a global component. Each component may have an active dialog with each other; the dialog may include two aspects: 1) a demand for computing resources, and 2) a total allowed number of computing resources. The global component may allocate resources from a pool of resources to different local components, and the local components in turn may assign their allocated resources to local competing requests. The allocation may also be throttled or limited at various levels.

27 Claims, 9 Drawing Sheets

(56) References Cited

U.S. PATENT DOCUMENTS

| | | | |
|---|---|---|---|
| 2015/0039767 A1* | 2/2015 | Matczynski | G06F 9/5072 709/226 |
| 2015/0058641 A1* | 2/2015 | Parikh | G06Q 50/06 713/300 |
| 2015/0215234 A1* | 7/2015 | Shanmuganathan | H04L 41/5025 709/226 |
| 2015/0234682 A1* | 8/2015 | Dageville | G06F 16/128 718/104 |
| 2015/0358251 A1* | 12/2015 | Varga | H04L 47/78 709/226 |
| 2015/0372881 A1* | 12/2015 | Bellomo | H04L 67/10 709/226 |
| 2016/0043967 A1* | 2/2016 | Jacob | G06F 9/5055 709/226 |
| 2016/0196168 A1* | 7/2016 | Koizumi | G06F 9/5077 718/104 |
| 2018/0089258 A1* | 3/2018 | Bhattacharjee | G06F 16/24535 |
| 2018/0089269 A1* | 3/2018 | Pal | G06F 16/24554 |
| 2018/0089306 A1* | 3/2018 | Pal | G06F 16/24554 |
| 2018/0210765 A1* | 7/2018 | McCormick | G06F 9/45504 |
| 2019/0018710 A1* | 1/2019 | Ambardekar | G06F 9/5011 |
| 2019/0179678 A1* | 6/2019 | Banerjee | G06F 9/5083 |
| 2019/0312772 A1* | 10/2019 | Zhao | G06F 9/5011 |
| 2020/0034073 A1* | 1/2020 | Saha | G06F 3/0659 |
| 2020/0050586 A1* | 2/2020 | Pal | G06F 16/148 |
| 2020/0050607 A1* | 2/2020 | Pal | G06F 9/4881 |
| 2020/0065303 A1* | 2/2020 | Bhattacharjee | G06F 11/076 |
| 2020/0169602 A1* | 5/2020 | Aronovich | G06F 9/5083 |
| 2020/0201883 A1* | 6/2020 | Cruanes | G06F 9/5083 |

* cited by examiner

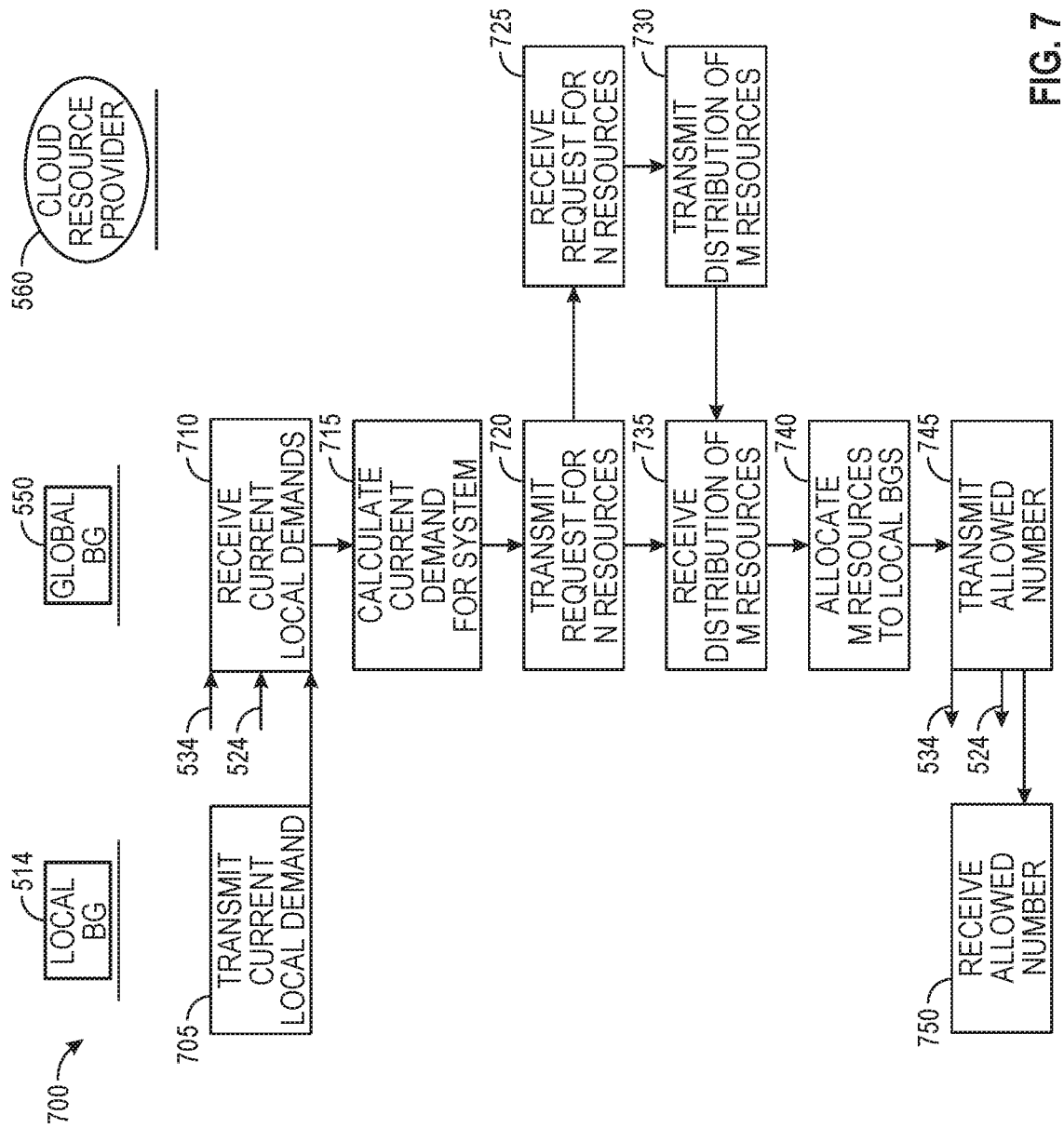

US 10,860,381 B1

FLEXIBLE COMPUTING

TECHNICAL FIELD

The present disclosure generally relates to flexible computing and, in particular, dynamic allocation of computing resources on a demand basis.

BACKGROUND

As the world becomes more data driven, database systems and other data systems are storing more and more data. For a business to use this data, different operations or queries are typically run on this large amount of data. Some operations, for example those including large table scans, can take a substantial amount of time to execute on a large amount of data. The time to execute such operations can be proportional to the number of computing resources used for execution, so time can be shortened using more computing resources.

To this end, some data systems can provide a pool of computing resources, and those resources can be assigned to execute different operations. However, in such systems, the assigned computing resources typically work in conjunction, for example in a process group. Hence, their assignments are fixed and static. That is, a computing resource can remain assigned to an operation, which no longer needs that computing resource. The assignments of those computing resources cannot be easily modified in response to demand changes. Hence, the computing resources are not utilized to their full capacity.

BRIEF DESCRIPTION OF THE DRAWINGS

Various ones of the appended drawings merely illustrate example embodiments of the present disclosure and should not be considered as limiting its scope.

FIG. 7 shows a flow diagram for allocating computing resources, according to some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments of the present disclosure may provide dynamic assignment techniques for allocating resources on a demand basis. Assignment control may be separated into at least two components: a local component and a global component. Each component may have an active dialog with each other; the dialog may include two aspects: 1) a demand for computing resources, and 2) a total allowed number of computing resources. The local component may set the first aspect, the current demand for computing resources; the global component may set the second aspect, the total allowed number of computing resources. This division of control provides benefits such as allocating resources proportionally to competing requests using fair distribution algorithms. The global component may allocate resources from a pool of resources to different local components, and the local components in turn may assign their allocated resources to local competing requests. Both the global and local components may utilize fair distribution algorithms for their respective allocations and assignments. Hence, the assignments of the resources may be dynamically modified as demand changes, leading to a more optimized use of computing resources.

Figure 1:
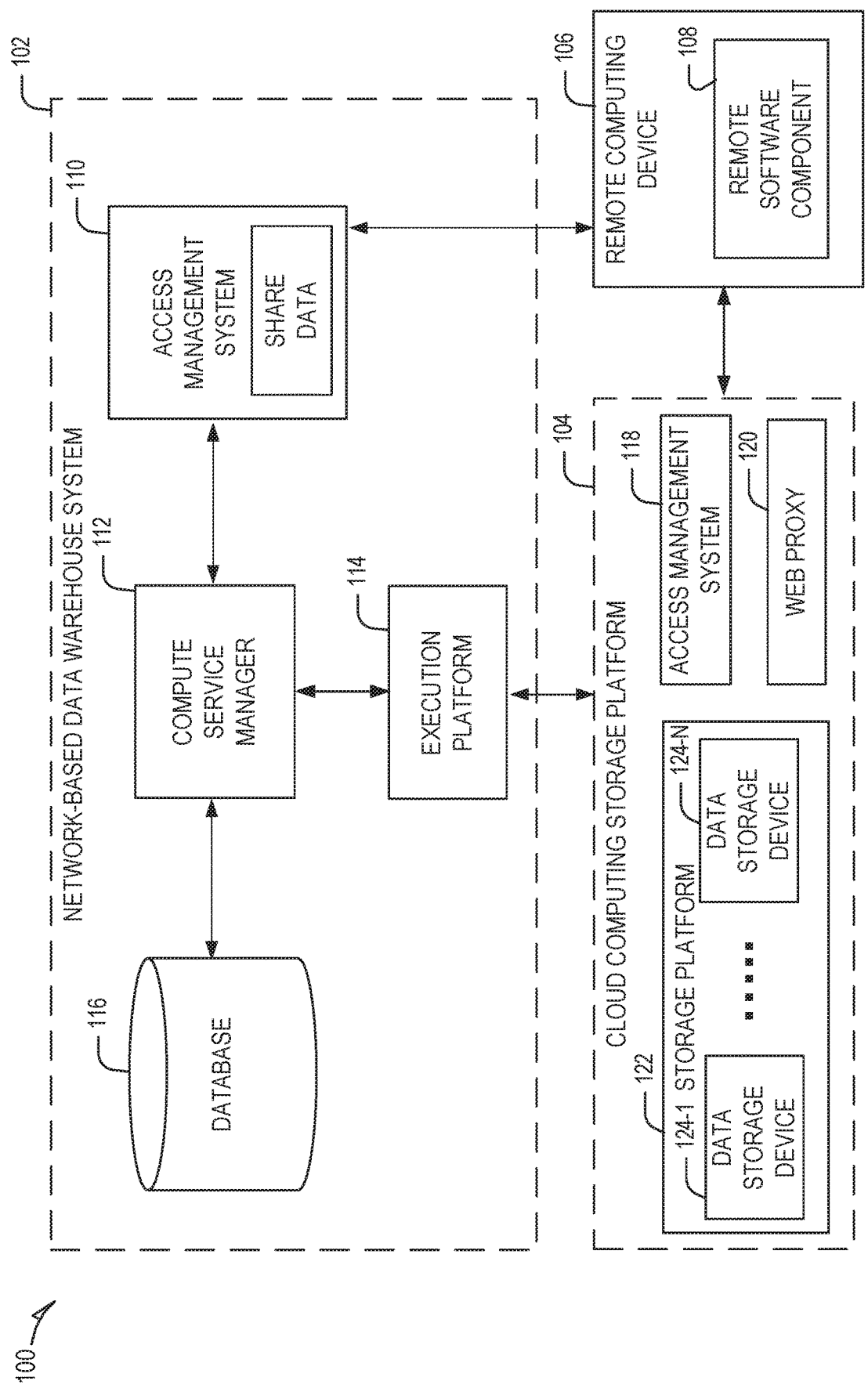
FIG. 1 illustrates an example computing environment in which a network-based data warehouse system can implement streams on shared database objects, according to some example embodiments.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-n that are part of a cloud computing storage platform 104. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-n supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
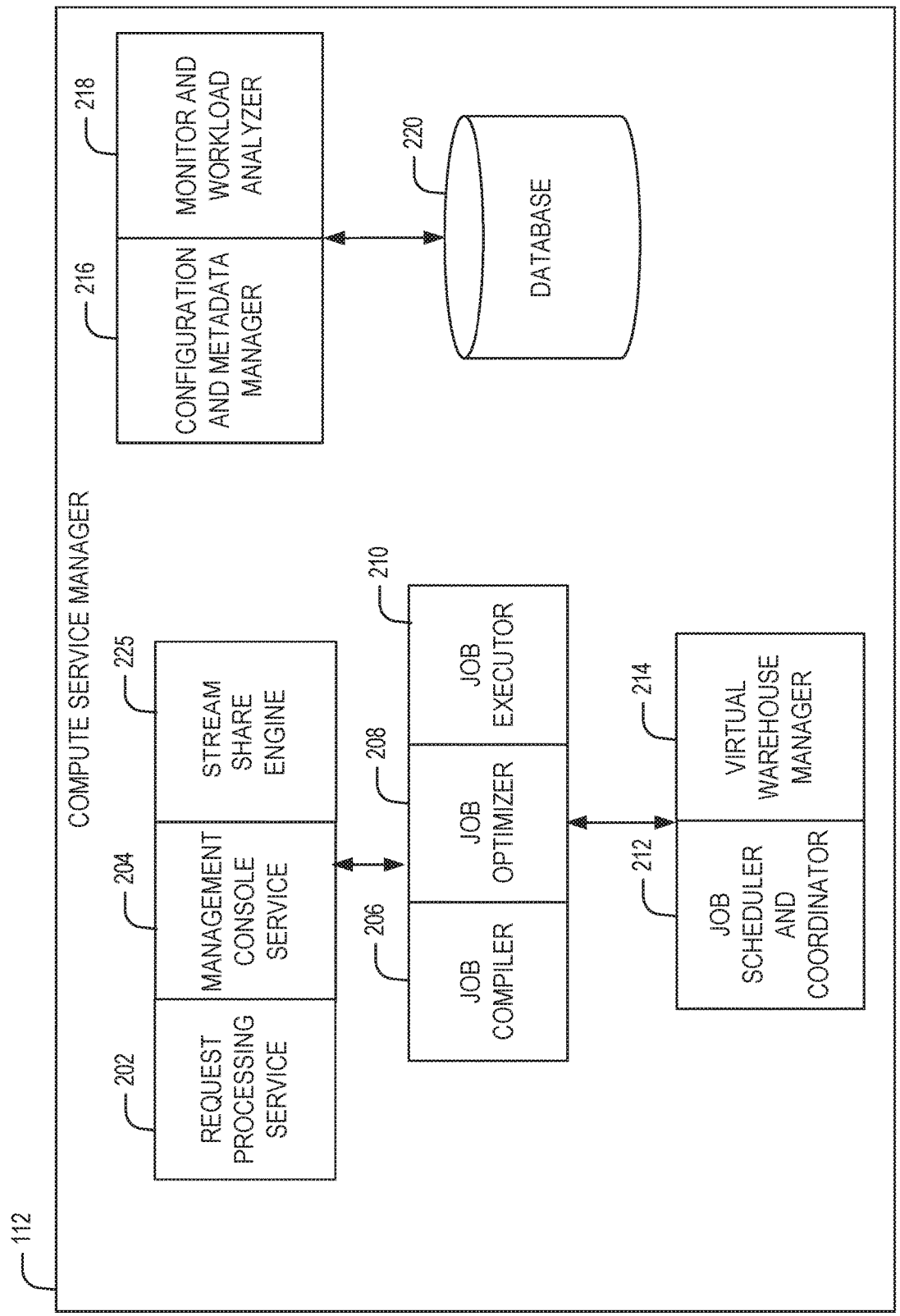
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, a operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
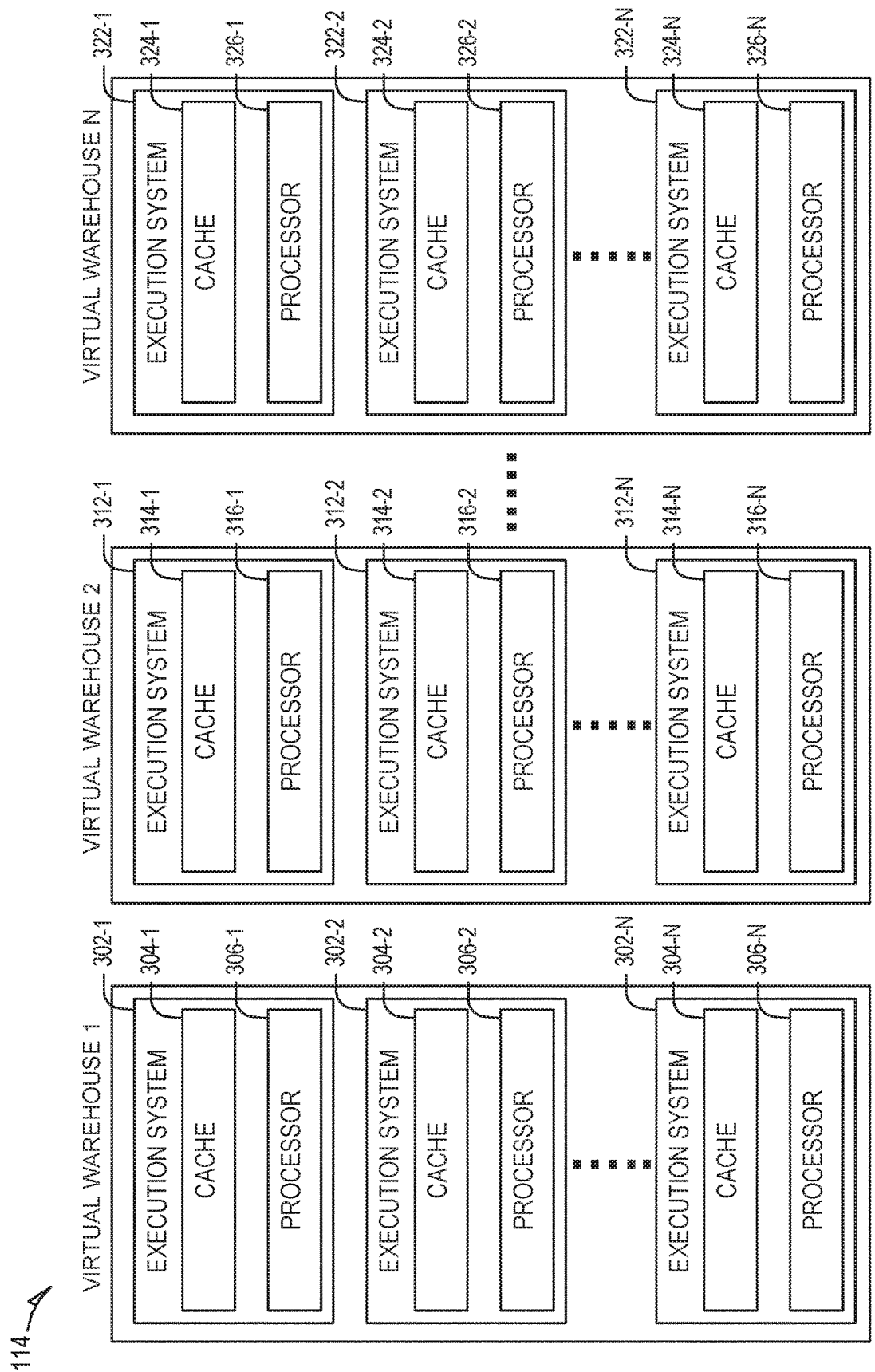
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
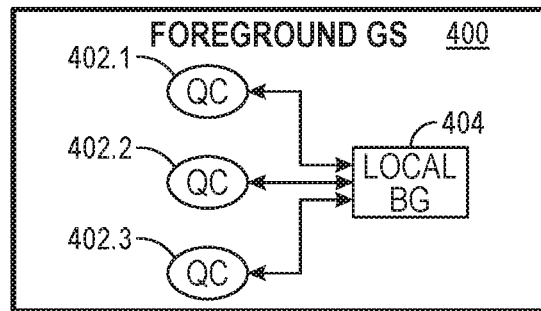
FIG. 4 is a block diagram illustrating a foreground global service, according to some example embodiments.

FIG. 4 shows an example foreground global service (GS) 400, according to some example embodiments. GS may also be referred to as a compute service manager. The foreground GS 400 may receive query requests and develop query plans to execute the query requests. The foreground GS 400 may broker requests to computing nodes or resources that execute a query plan, as explained in further detail herein. The foreground GS 400 may include query coordinators (QCs) 402.1-402.3, which are coupled to a local background service (BG) 404. In an embodiment, the foreground GS 400 may be defined for a particular type of service, such as copy (replicate), ingest (a type of large table scan), compute, large table scan type queries, etc. The QCs 402.1-402.3 may receive query requests from different sources, which may have different account IDs. For certain operations, such as those involving multiple computing resources working together to execute different portions of an operation (e.g., large table scans), the source may be defined at a data warehouse level granularity. The QCs 402.1-402.3 may communicate information regarding the query requests and their sources to the local BG 404.

As explained in further detail below, the local BG 404 may assign computing resources (also sometimes referred to as execution platforms) to the QC 402.1-402.3. The computing resources may be computing nodes allocated to the foreground GS 400 from a pool of computing nodes. In an embodiment, the computing resources may be machines, servers, and/or processors. In an embodiment, the computing resources may be processing cores of a machine. Upon receiving its assignment of computing resources, the QCs 402.1-402.3 may communicate directly with the assigned computing resources to execute respective query plans.

Figure 5:
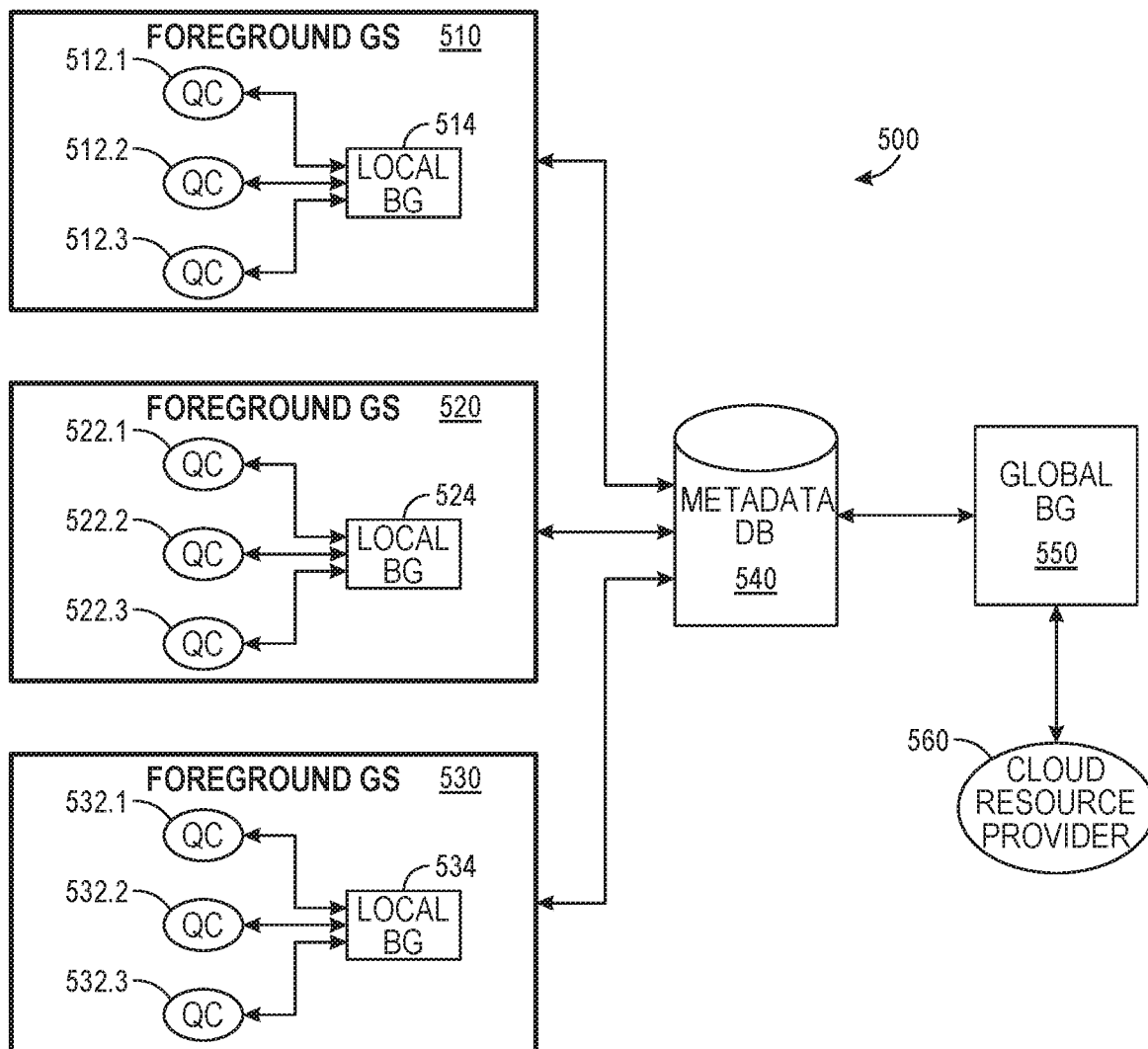
FIG. 5 is a block diagram illustrating a network system, according to some example embodiments.

FIG. 5 shows an example of a network system 500 for allocating computing resources, according to some example embodiments. The network system 500 may include a plurality of foreground services 510, 520, 530. Each foreground service may include a plurality of query coordinators and local BGs as described above. For example, foreground service 510 may include query coordinators 512.1-512.3 coupled to a local BG 514; foreground service 520 may include query coordinators 522.1-522.3 coupled to a local BG 524; and foreground service 530 may include query coordinators 532.1-532.3 coupled to a local BG 534.

The local BGs 514, 524, 534 may communicate with a global BG 550 over a network. In an embodiment, communications between the local BGs 514, 524, 534 and the global BG 550 may be performed via a metadata database 540. That is, the local BG 514, 524, 534 may transmit messages, for example relating to their current computing demands, to the metadata database 540, where the information from those messages may be stored. And the global BG 550 may read the information sent by the local BG 514, 524, 534 from the metadata database 540. In another embodiment, communications between the local BGs 514, 524, 534 and the global BG 550 may be performed directly via, for example, remote procedure calls such as gRPCs. Moreover, communications between the local BGs 514, 524, 534 and the global BG 550 may be performed using a combination of direct communication (e.g., remote procedure calls) and indirect communications (e.g., via metadata database).

The global BG 550 may be coupled to a cloud resource provider 560. The cloud resource provider 560 may maintain a pool of computing resources. In an embodiment, the global BG 550 may communicate with a communication layer over the cloud resource provider 560.

As explained in further detail below, the network system 500 may implement dynamic computing resource allocation techniques by dividing allocation or assignment controls between the local BGs 514, 524, 534 and the global BG 550. Each of the allocation-control components, the local BGs and the global BG, may allocate or assign computing resources based on fair distribution algorithms, such as a Max-min fairness algorithm. And each of the allocation-control components may modify their allocations or assignments on a demand basis.

Figure 6:
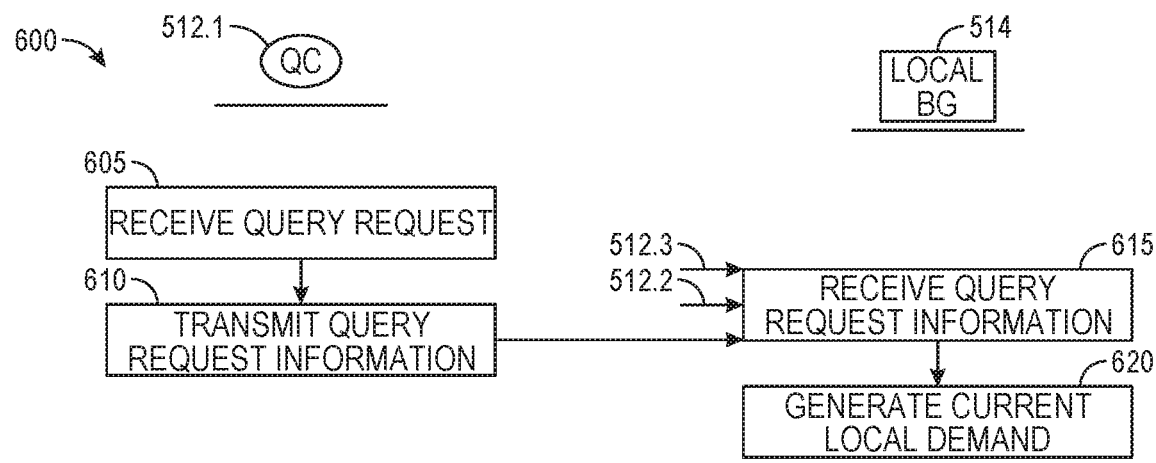
FIG. 6 shows a flow diagram for calculating a local demand for computing resources, according to some example embodiments.

FIG. 6 shows a flow diagram of a method 600 for calculating a local demand for computing resources by a foreground GS, according to some example embodiments. As shown, portions of the method 600 may be executed by QCs (e.g., QC 512.1) and a local BG (e.g., local BG 514).

At operation 605, the QC may receive a query request from a source. For example, the query request may be a copy command or large scan command or the like. The source may be identified by an account ID or by the data warehouse or the like. At operation 610, the QC may communicate information regarding the query request to the local BG; the communicated information may include the source of the query request. Other QCs in the foreground GS may also communicate information regarding their respective query requests to the local BG, including the sources of the query requests. In an embodiment, the foreground GS may be service-specific; for example, while it may handle queries from different sources, the foreground GS may handle one service type, e.g., copy, ingest, large table scan, etc.

At operation 615, the local BG may receive and collect query information from its QCs. At operation 620, the local BG may consolidate the query information from the QCs, translate the demand by the QCs to a per source (or account) demand, and may calculate a current local demand for computing resources for the foreground GS. The local BG may store and maintain the current local demand for computing resources with the information regarding demand per source in a local memory.

Communicating the current local demand and receiving a current allowed number of resources from the global BG is described next with reference to FIG. 7. FIG. 7 shows a flow diagram of a method 700 for allocation of computing resources by a global BG, according to some example embodiments. As shown, portions of the method 700 may be executed by local BGs (e.g., local BG 514), a global BG (e.g., global BG 550), and cloud resource provider (e.g., cloud resource provider 560). Also, as discussed herein, communication between the local BGs and the global BGs may be performed at least in part via a metadata DB (e.g., 540). For the sake of clarity and brevity, the metadata DB is not shown in FIG. 7, but it should be understood that communications between the local BG and the global BG may be performed in whole or in part via a metadata DB. It should also be understood that communications between global BG and the cloud resource provider may be performed via a communication layer over the cloud resource provider.

At operation 705, the local BG may communicate its current local demand for computing resources and the information regarding demand per source. In an embodiment, the local BG may be collecting, updating, and storing this information (current local demand and source information) in its local memory and may be polled by the global BG to communicate this information periodically (say, every two minutes). At that time, the local BG may communicate the latest information stored in its memory. In an embodiment, the frequency of communicating the current local demand may be adjusted based on system conditions. For example, if the demand is more volatile, the frequency of reporting may be increased, and if the demand is less volatile, the frequency of reporting may be decreased.

At operation 710, the global BG may receive and collect the current local demands and source information from the local BGs. At operation 715, based on the collected information, the global BG may calculate a current demand for the system, N number of resources. In an embodiment, calculated current demand for the system, N, may be the sum of the current local demands of the local BGs. In an embodiment, N may be less than the sum of the current local demands of the local BGs. For example, the global BG may smooth the data and/or factor historical data in its calculation of the current demand for the system. This may prevent requesting too many resources based on a short-lasting spike in demand where the resources may be not fully utilized once the spike in demand dissipates. Additionally, the global BG may review the source information from the different query requests and determine that one or more of the sources may not be eligible to receive all demanded resources related to their requests, based on a quota or an account cap of resources for a source. The quota or account cap may be set by a source or an administrator.

At operation 720, the global BG may request the cloud resource provider for the N number of resources. At operation 725, the cloud resource provider may receive the request for the N number of resources. The cloud resource provider may also receive requests from other sources. At operation 730, the cloud provider may transmit a distribution of M number of computing resources to the global BG and identification of the M computing resources, and at operation 735, the global BG may receive this information. In an embodiment, M may be equal to or less than N. In other words, the global BG may receive all the computing resources requested or may receive fewer computing resources than requested.

At operation 740, the global BG may allocate the M computing resources, or at least a portion thereof, to the different local BGs using fair distribution algorithms, such as a Max-min fairness algorithm. The global BG may set the allowed number of computing resources for each local BG. In an embodiment, the global BG may employ tiered hierarchical classification for allocation. For example, a top tier may be service type, where the global BG may distribute the M computing resources based on service types. Some services may be prioritized over other services. Under the service tier, the next tier may be source. Here, the allocated computing resources under each service type may then be distributed based on the sources of the query requests. Under the source tier, the next tier may be GSes. That is, the allocated resources under each source type may then be distributed based on the GSes that are submitting the requests.

In an embodiment, source classification may be used for implementing limiting and throttling, if needed, based on set quotas or cap limits for sources. For example, a source may set a quota or cap limit of how many resources it can use for a time period, for example a month. Therefore, the global BG may limit or throttle the computing resources allocated to a source based on the quota for that source.

At operation 745, the global BG may communicate its allocation decision to the local BGs. The global BG may communicate to each local BG its respective allowed number of computing resources. In an embodiment, the global BG may communicate the allocation of M computing resources. At operation 750, the local BG may receive notification of its allocation, e.g., its allowed number of computing resources.

The global BG may also maintain a list of the M computing resources, or at least a portion thereof that are to be allocated to the local BGs, for example as a persistent list. In an embodiment, the global BG may assign the computing resources to the local BGs based on each local BG's allowed number of computing resources. For example, the global BG may communicate identification information of the assigned computing resources to each of the local BGs. In another embodiment, the global BG may maintain the list of M computing resources and may allow each local BG to claim computing resources up to their allowed number of computing resources. The global BG may maintain a list of the computing resources assigned to each of the local BGs. In an embodiment, the list of the computing resources and their assignments may be maintained in the metadata DB. For example, the list may be maintained in the metadata DB by the global BG, and different identifiers may be used to identify whether a computing resource is assigned or free, and if assigned, to which local BG (or foreground GS) it is assigned. As explained in further detail below, each local BG may be capable of releasing computing resources and may communicate notifications of that release to update the list.

Figure 8A:
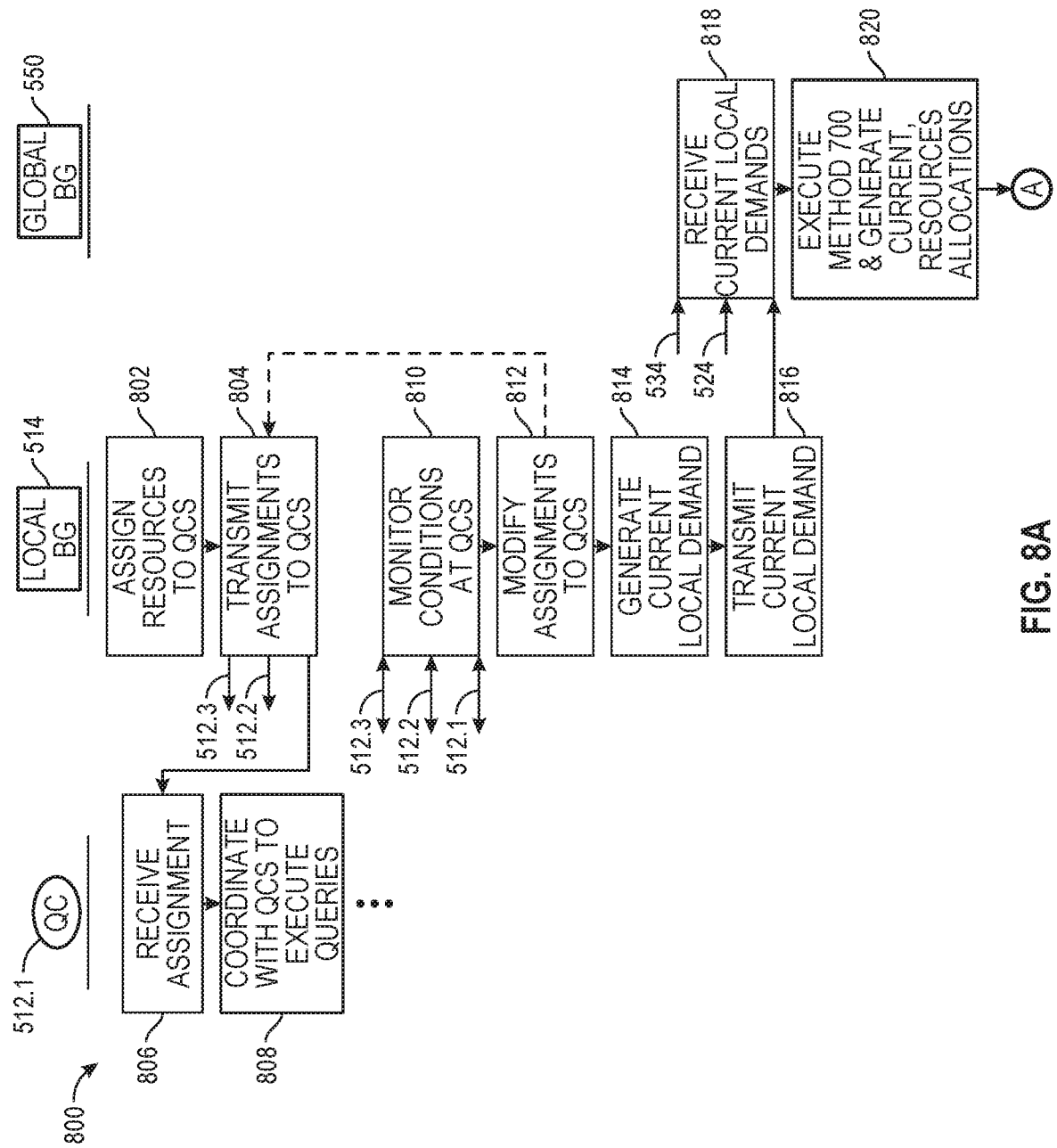
FIGS. 8A-8B show a flow diagram for dynamic allocation of computing resources, according to some example embodiments.
Figure 8B:
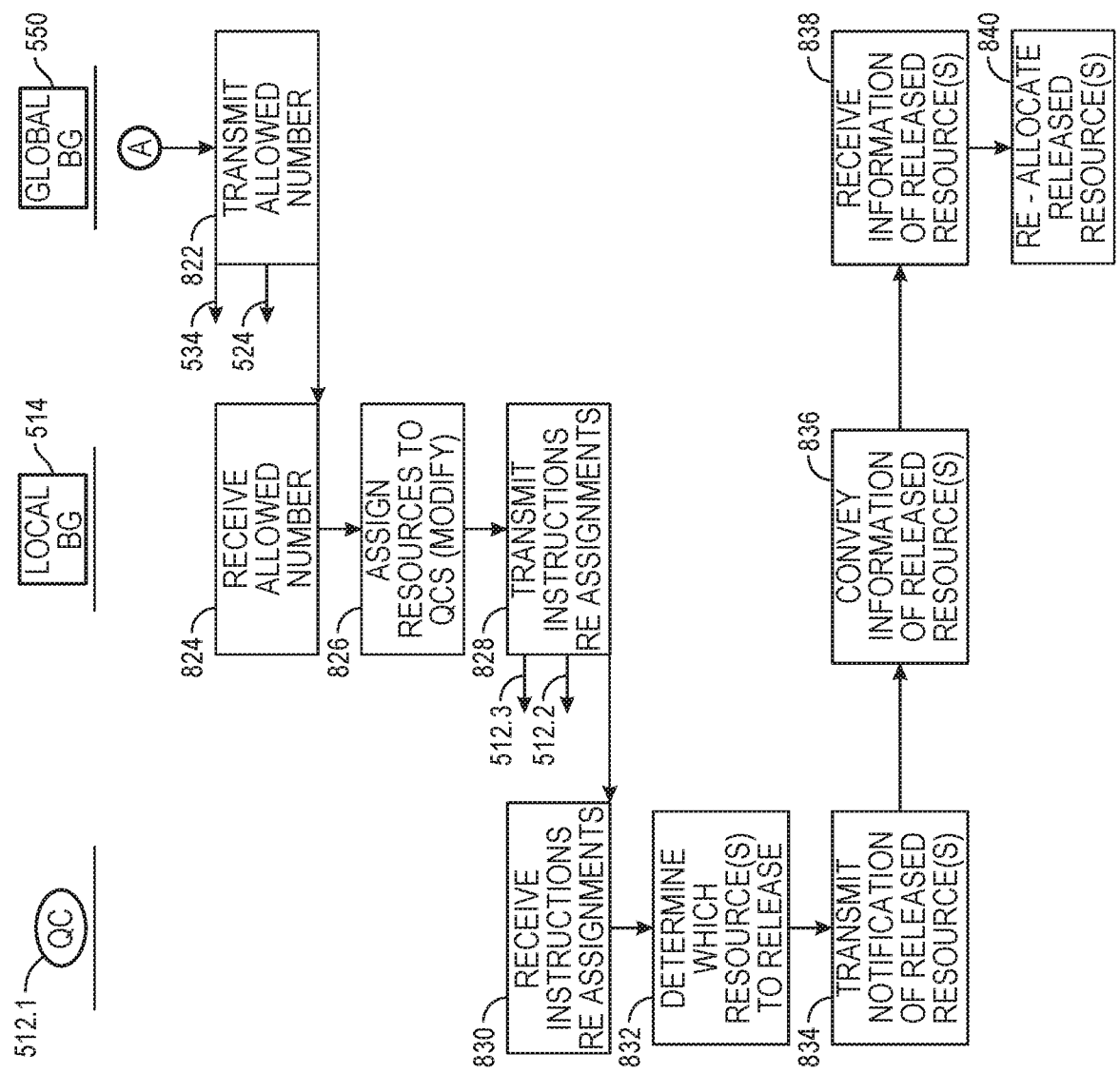

FIGS. 8A-8B show a flow diagram of a method 800 for dynamic allocation of computing resources by local and global BGs, according to some example embodiments. As shown, portions of the method 800 may be executed by QCs (e.g., QC 512.1), local BG (e.g., local BG 514), a global BG (e.g., global BG 550). Also, as discussed herein, communication between the local BGs and the global BGs may be performed at least in part via a metadata DB. For the sake of clarity and brevity, the metadata DB is not shown in FIGS. 8A-8B, but it should be understood that communications between the local BG and the global BG may be performed in whole or in part via a metadata DB.

At operation 802, in response to receiving its allowed number of computing resources from the global BG (e.g., operation 750), the local BG may assign computing resources to its QCs. This assignment may be implemented using fair distribution algorithms, such as a Max-min fairness algorithm. In an embodiment, local BG may consider the source of the query requests in its assignment decision making. For example, the local BG may assign the computing resources to each source based on the current allowed number of resources and request ordering.

At operation 804, the local BG may communicate the computing resource assignments to the QCs. The assignment may include identification information for the computing resources. At operation 806, the QC may receive its assignment of computing resources from the local BG. At operation 808, the QC may coordinate with its assigned computing resources to execute respective query results. The QC may communicate directly with its assigned computing resources for scheduling jobs. The QC, for example, may distribute files or batches of files to the computing resource to process. The QC may track the performance of its assigned computing resources.

At operation 810, the local BG may monitor conditions at the QCs and may reassign the computing resources to the QCs, as needed. For example, the QCs may be polled to send information to the local BG. At operation 812, in response to monitoring performance by the QCs, the local BG may dynamically reassign the computing resources to its various QCs in the time between being polled by the global BG. For example, this reassignment may be performed by the local BG periodically, say every 10 or 30 seconds (as compared to every two minutes by the global BG). Hence, the local BG may assign and reassign computing resources at a faster rate and with more flexibility, as compared to the global BG, thus optimizing the use of the assigned computing resources. Moreover, because the local BG may store its list of allocated computing resources and their assignments to QC in local memory (as compared to a persistent list in a metadata DB, for example), the speed of changing assignments to QCs may be increased. The local BG and the QCs may repeat operations 804-812 until the time to generate the next current local demand at the local BG.

As discussed above, the local BGs may be polled periodically (say, every two minutes) regarding their current demand for computing resources. At operation 814, the local BG, based on the monitored conditions from the QCs (e.g., operations 610-615, 810), may calculate its current local demand for computing resources for the foreground service (e.g., operation 620). At operation 816, the local BG may communicate its current local demand to the global BG, which may receive the current local demands from the local BGs at operation 818. At operation 820, the global BG may interact with the cloud resource provider and generate the current allocation (e.g., current allowed number of computing resources for each local BG) as discussed above with reference to FIG. 7, e.g., execute method 700 or portions thereof.

At operation 822, the global BG may communicate its current (revised) allocation decision to the local BGs. For example, the global BG may communicate to each local BG its respective allowed number of computing resources. At operation 824, the local BG may receive notification of its allocation, e.g., its allowed number of computing resources. The local BG may synchronize its stored information regarding current allowed number of computing resources accordingly. If the current allowed number of resources has been increased, the local BG may claim additional computing resources from the list maintained by the global BG and use those additional computing resources to schedule its jobs on. At operation 826, the local BG may assign computing resources to its QC (or modify previous assignments).

Next, consider an example where the allowed number of computing resources for the local BG has been reduced. For example, the local BG was previously allocated ten computing resources, but it has now been allocated eight computing resources by the global BG—a reduction of two. In this example, the local BG must release two computing resources to the global BG. At operation 828, the local BG may transmit instructions to the QC to release one or more computing resources, and the QC may receive the instructions at operation 830. At operation 832, the QC may determine which computing resource(s) to release. The QC may allow the selected computing resource(s) to complete its current operation, for example operating on a file or on a batch of files, and may cease to distribute any more files to the selected computing resource(s), thus concluding its use the selected computing resource(s). At operations 834, the QC may notify the local BG which selected computing resource(s) (e.g., identification information of released computing resource(s)) it is no longer using, and the local BG may receive that notification at operation 836 and may pass that information to the global BG at operation 838.

Next, at operation 840, in response to receiving notification of released resources(s), the global BG may further implement its current allocation (e.g., operation 818). For example, if the released computing resource(s) are to be allocated to other local BGs, the global BG may communicate a notification of that allocation to those other local BGs as discussed herein. If the released computing resources are to be released back to the cloud resource provider, the global BG may communicate a notification of that release to the cloud resource provider. The list of the computing resource assignments may be revised accordingly.

Moreover, the network system for allocation control may implement recovery procedures in the event one or more components experience a failure. As discussed herein, the network system for allocation control may include at least three primary components: 1) the QCs, 2) the local BGs (or foreground GSes), and 3) the global BG. If a QC experiences a failure, the local BG may detect the failure and modify the query plans accordingly. This may involve reassigning queries and computing resources. If a local BG (or a foreground GS) experiences a failure, the global BG may purge that local BG's information until the local BG is recovered. And if the global BG experiences a failure, the state of the allocations (e.g., current demand per local BG, current allowed number per local BG) may be recovered from prior dialogs or communications until the global BG recovers.

Figure 9:
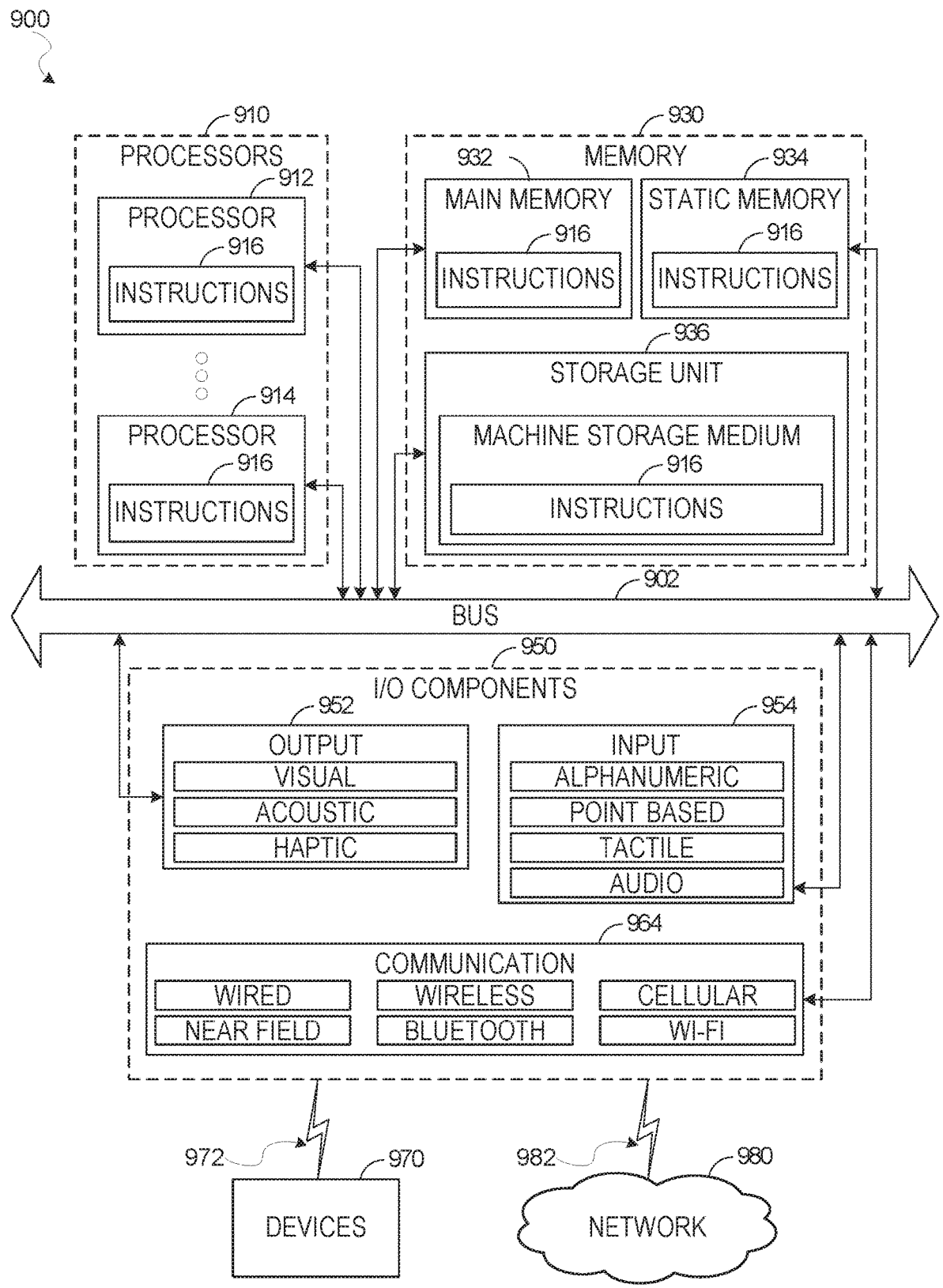
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods 600, 700, and 800. As another example, the instructions 916 may cause the machine 900 to implemented portions of the data flows illustrated in any one or more of FIGS. 1-8. In this way, the instructions 916 transform a general, non-programmed machine into a particular machine 900 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine.

For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 110, the compute service manager 112, the execution platform 114, the access management system 118, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 600, 700, and 800 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1

A method comprising: receiving, by one or more processors of a local background service, information relating to query requests from a plurality of query coordinators; updating the current local demand for computing resources; communicating the updated current local demand to the global background service; receiving an updated current allowed number of computing resources from the global background service; and assigning the current allowed number of computing resources to the plurality of query coordinators such that the query coordinators communicate directly with assigned computing resources to execute the query requests.

Example 2

The method of example 1, further comprising: consolidating the query requests per source to generate a per source demand; and communicating the per source demand to the global background service.

Example 3

The method of any of examples 1-2, further comprising: monitoring conditions at the query coordinators; and based on the monitored conditions, reassigning the current allowed number of computing resources to the plurality of query coordinators.

Example 4

The method of any of examples 1-3, further comprising receiving updated information relating to query requests from the plurality of query coordinators; updating the current local demand for computing resources; communicating the updated current local demand to the global background service; receiving an updated current allowed number of computing resources from the global background service; and assigning the updated current allowed number of computing resources to the plurality of query coordinators.

Example 5

The method of any of examples 1-4, further comprising: in response to the updated current allowed number of computing resources being fewer than the current allowed number of computing resources, transmitting an instruction to release an assigned computing resource to one of the plurality of query coordinators; receiving a notification from the one of the plurality of query coordinators including identification information of a released computing resource; and communicating the identification information of the released computing resource to global background service.

Example 6

The method of any of examples 1-5, wherein a computing resource comprises a processing core of a machine.

Example 7

A method comprising: receiving, by one or more processors of a global background service, a current demand for computing resources from a plurality of local background services; calculating a current demand for computing resources for a system based on the received current demands for computing resources; based on the calculated current demand for the system, requesting N number of computing resources from a cloud provider, the cloud provider controlling a pool of computing resources; receiving a distribution of M number of computing resources from the cloud provider; and allocating at least a portion of the M number of computing resources to the plurality of local background services based at least in part on a fair distribution algorithm.

Example 8

The method of example 7, further comprising: receiving periodically updated current demands for computing resources from the plurality of local background services; and based on the updated current demands, modifying the allocation of computing resources to the plurality of local background services.

Example 9

The method of any of examples 7-8, further comprising: reducing the allocation of computing resources of a first one of the plurality of local background services; receiving a notification from the first local background service regarding a release of one of its allocated computing resource; and allocating the released computing resource to a second one of the plurality of local background services.

Example 10

The method of any of examples 7-9, wherein calculating the current demand for computing resources for the system is further based on historical data.

Example 11

The method of any of examples 7-10, wherein M is less than N.

Example 12

The method of any of examples 7-11, wherein the fair distribution algorithm includes a Max-Min fairness algorithm.

Example 13

The method of any of examples 7-12, further comprising: receiving per source demand information from the local background services, wherein allocating the computing resources to the plurality of local background services is further based on the per source demand information.

Example 14

A system comprising: one or more processors of a machine; and a memory storing instructions that, when executed by the one or more processors, cause the machine to perform operations implementing any one of example methods 1 to 13.

Example 15

A machine-readable storage device embodying instructions that, when executed by a machine, cause the machine to perform operations implementing any one of example methods 1 to 13.

What is claimed is:

1. A method comprising:
receiving, by one or more processors of a local background service, information relating to query requests from a plurality of query coordinators;
based on the information relating to query requests, generating a current local demand for computing resources;
communicating the current local demand for computing resources to a global background service over a network;
receiving a current allowed number of computing resources from the global background service;
assigning the current allowed number of computing resources to the plurality of query coordinators such that the query coordinators communicate directly with assigned computing resources to execute the query requests;
communicating an updated current local demand to the global background service;
receiving an updated current allowed number of computing resources from the global background service;
assigning the updated current allowed number of computing resources to the plurality of query coordinators; and
in response to the updated current allowed number of computing resources being fewer than the current allowed number of computing resources, transmitting an instruction to release an assigned computing resource to one of the plurality of query coordinators.

2. The method of claim 1, further comprising:
consolidating the query requests per source to generate a per source demand; and
communicating the per source demand to the global background service.

3. The method of claim 1, further comprising:
monitoring conditions at the query coordinators; and
based on the monitored conditions, reassigning the current allowed number of computing resources to the plurality of query coordinators.

4. The method of claim 1, further comprising:
receiving updated information relating to query requests from the plurality of query coordinators; and
updating the current local demand for computing resources.

5. The method of claim 4, further comprising:
receiving a notification from the one of the plurality of query coordinators including identification information of a released computing resource; and
communicating the identification information of the released computing resource to global background service.

6. The method of claim 1, wherein a computing resource comprises a processing core of a machine.

7. A method comprising:
receiving, by one or more processors of a global background service, a current demand for computing resources from a plurality of local background services;
calculating a current demand for computing resources for a system based on the received current demands for computing resources;
based on the calculated current demand for the system, requesting N number of computing resources from a cloud provider, the cloud provider controlling a pool of computing resources;
receiving a distribution of M number of computing resources from the cloud provider;

allocating at least a portion of the M number of computing resources to the plurality of local background services based at least in part on a fair distribution algorithm;

receiving periodically updated current demands for computing resources from the plurality of local background services;

based on the updated current demands, modifying the allocation of computing resources to the plurality of local background services;

reducing the allocation of computing resources of a first one of the plurality of local background services; and receiving a notification from the first local background service regarding a release of one of its allocated computing resource.

8. The method of claim 7, further comprising:
allocating the released computing resource to a second one of the plurality of local background services.

9. The method of claim 7, wherein calculating the current demand for computing resources for the system is further based on historical data.

10. The method of claim 7, wherein M is less than N.

11. The method of claim 7, wherein the fair distribution algorithm includes a Max-Min fairness algorithm.

12. The method of claim 7, further comprising:
receiving per source demand information from the local background services, wherein allocating the computing resources to the plurality of local background services is further based on the per source demand information.

13. A machine-storage medium embodying instructions that, when executed by a machine, cause the machine to perform operations comprising:

receiving, by one or more processors of a global background service, a current demand for computing resources from a plurality of local background services;

calculating a current demand for computing resources for a system based on the received current demands for computing resources;

based on the calculated current demand for the system, requesting N number of computing resources from a cloud provider, the cloud provider controlling a pool of computing resources;

receiving a distribution of M number of computing resources from the cloud provider;

allocating at least a portion of the M number of computing resources to the plurality of local background services based at least in part on a fair distribution algorithm;

receiving periodically updated current demands for computing resources from the plurality of local background services;

based on the updated current demands, modifying the allocation of computing resources to the plurality of local background services;

reducing the allocation of computing resources of a first one of the plurality of local background services; and receiving a notification from the first local background service regarding a release of one of its allocated computing resource.

14. The machine-storage medium of claim 13, further comprising:
allocating the released computing resource to a second one of the plurality of local background services.

15. The machine-storage medium of claim 13, wherein calculating the current demand for computing resources for the system is further based on historical data.

16. The machine-storage medium of claim 13, wherein M is less than N.

17. The machine-storage medium of claim 13, wherein the fair distribution algorithm includes a Max-Min fairness algorithm.

18. The machine-storage medium of claim 13, further comprising:
receiving per source demand information from the local background services, wherein distributing the M number of computing resources to the plurality of local background services if further based on the per source demand information.

19. A system comprising:
a plurality of local background services, each comprising:
one or more processors of a first machine; and
a first memory storing instructions that, when executed by the one or more processors, cause the first machine to perform operations comprising:
receive information relating to query requests from a plurality of query coordinators;
based on the information relating to query requests, generate a current local demand for computing resources; and
a global background service, comprising:
one or more processors of a second machine; and
a second memory storing instructions that, when executed by the one or more processors, cause the second machine to perform operations comprising:
receive the current demand for computing resources from each of the plurality of local background services;
calculate a current demand for computing resources for a system based on the received current demands for computing resources;
based on the calculated current demand for the system, request N number of computing resources from a cloud provider, the cloud provider controlling a pool of computing resources;
receive a distribution of M number of computing resources from the cloud provider; and
allocate at least a portion of the M number of computing resources to the plurality of local background services based at least in part on a fair distribution algorithm;
receive periodically updated current demands for computing resources from the plurality of local background services;
based on the updated current demands, modify the allocation of computing resources to the plurality of local background services:
reduce the allocation of computing resources of a first one of the plurality of local background services; and
receive a notification from the first local background service regarding a release of one of its allocated computing resource.

20. The system of claim 19, further comprising:
a metadata database, wherein communications between the plurality of local background services and the global background service are conducted at least in part via the metadata database.

21. The system of claim 19, the operations of each of the plurality of local background services further comprising:
assigning its allocated computing resources to the plurality of query coordinators such that the query coordinators communicate directly with their respective computing resources to execute the query requests.

22. The system of system of claim 21, the operations of each of the plurality of local background services further comprising:
monitoring conditions at the query coordinators; and based on the monitored conditions, reassigning the allocated computing resources to the plurality of query coordinators.

23. The system of system of claim 19, wherein a computing resource is a processing core of a machine.

24. The system of claim 19, the operations of the global background service further comprising:
allocating the released computing resource to a second one of the plurality of local background services.

25. The system of claim 19, wherein calculating the current demand for computing resources for the system is further based on historical data.

26. The system of claim 19, wherein the fair distribution algorithm includes a Max-Min fairness algorithm.

27. The system of claim 19, the operations of the global background service further comprising:
receiving per source demand information from the local background services, wherein allocating the computing resources to the plurality of local background services is further based on the per source demand information.

* * * * *

UNITED STATES PATENT AND TRADEMARK OFFICE
CERTIFICATE OF CORRECTION

PATENT NO. : 10,860,381 B1
APPLICATION NO. : 16/874388
DATED : December 8, 2020
INVENTOR(S) : Cruanes et al.

Page 1 of 1

It is certified that error appears in the above-identified patent and that said Letters Patent is hereby corrected as shown below:

In the Claims

In Column 24, Line 47, in Claim 19, delete "services:" and insert --services;-- therefor Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*